UNITED STATES PATENT OFFICE.

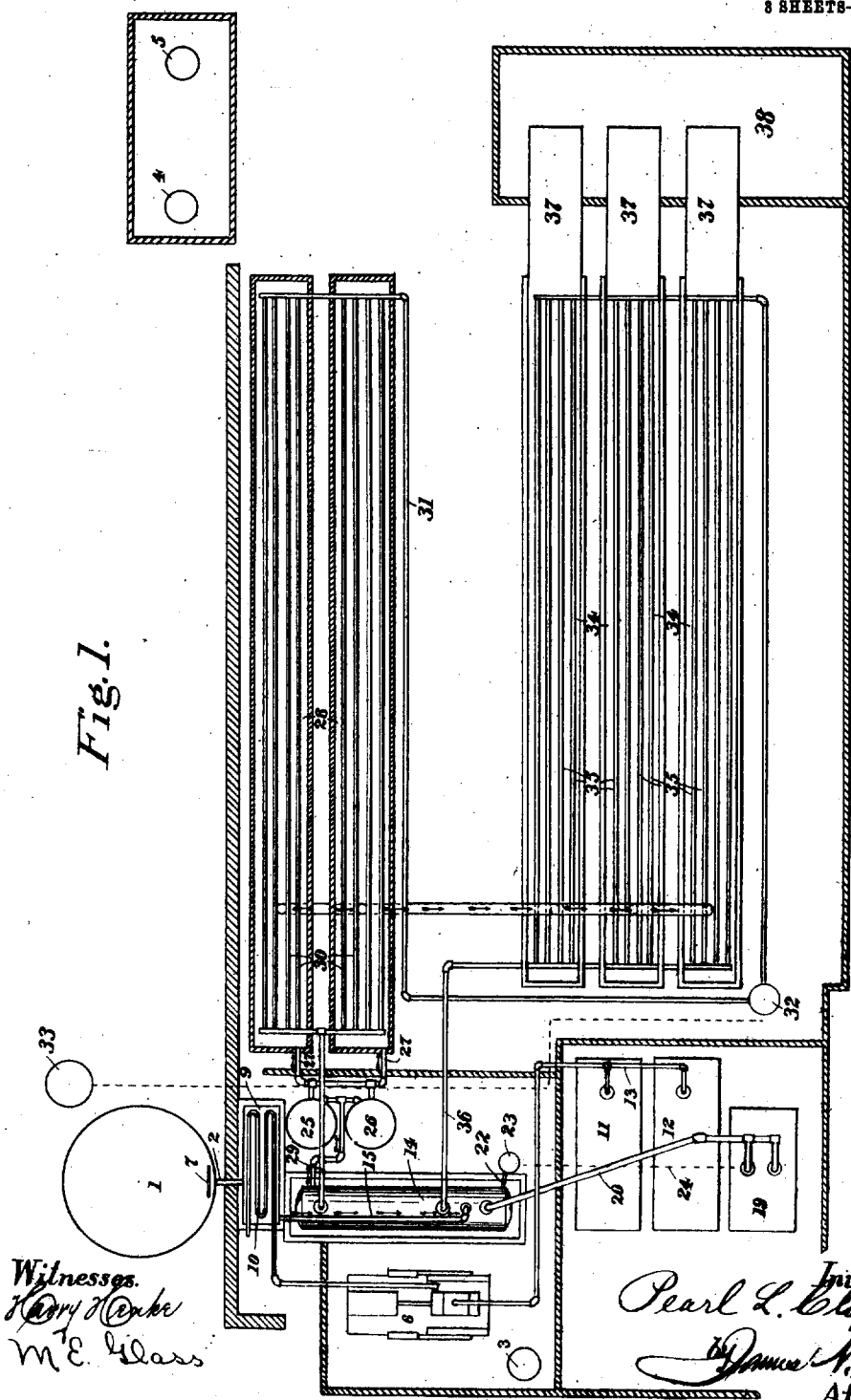

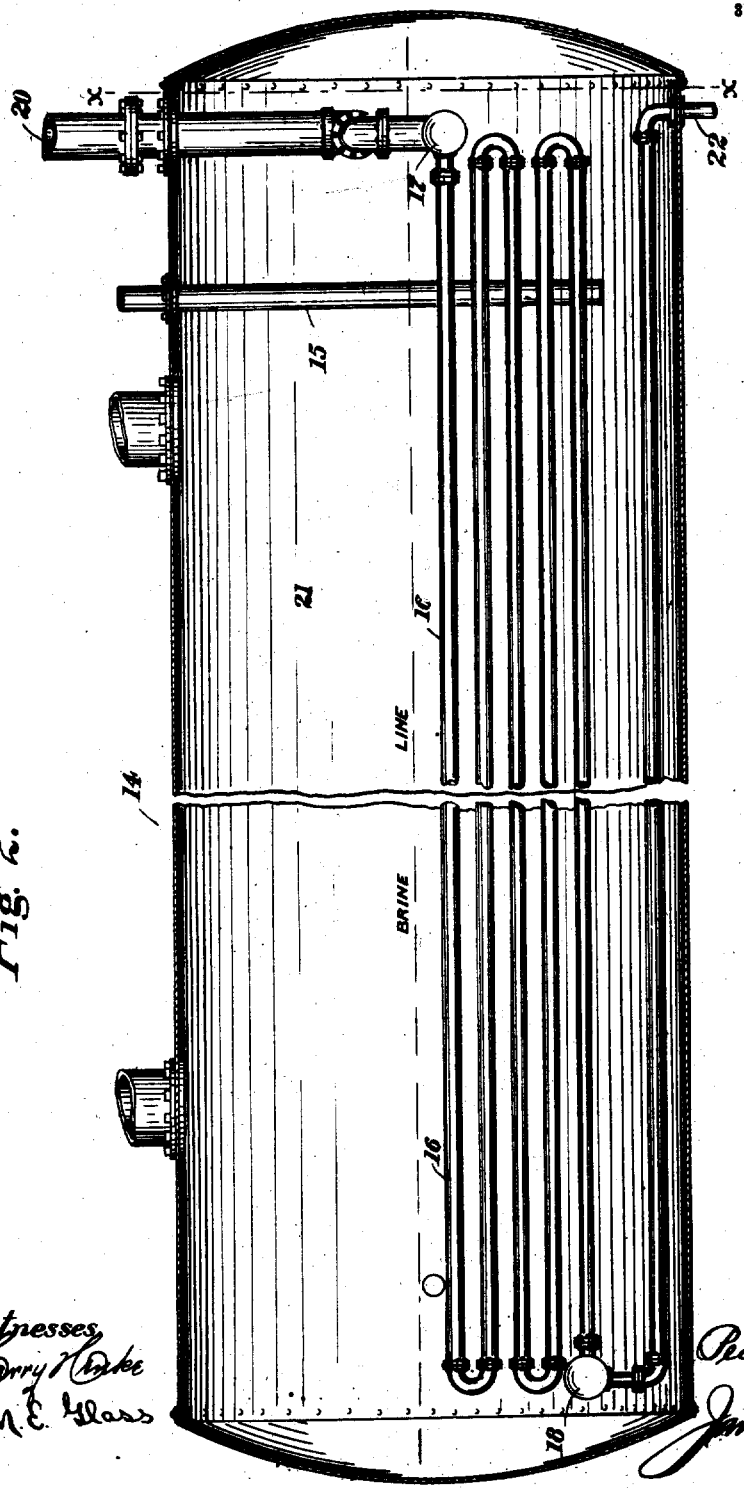

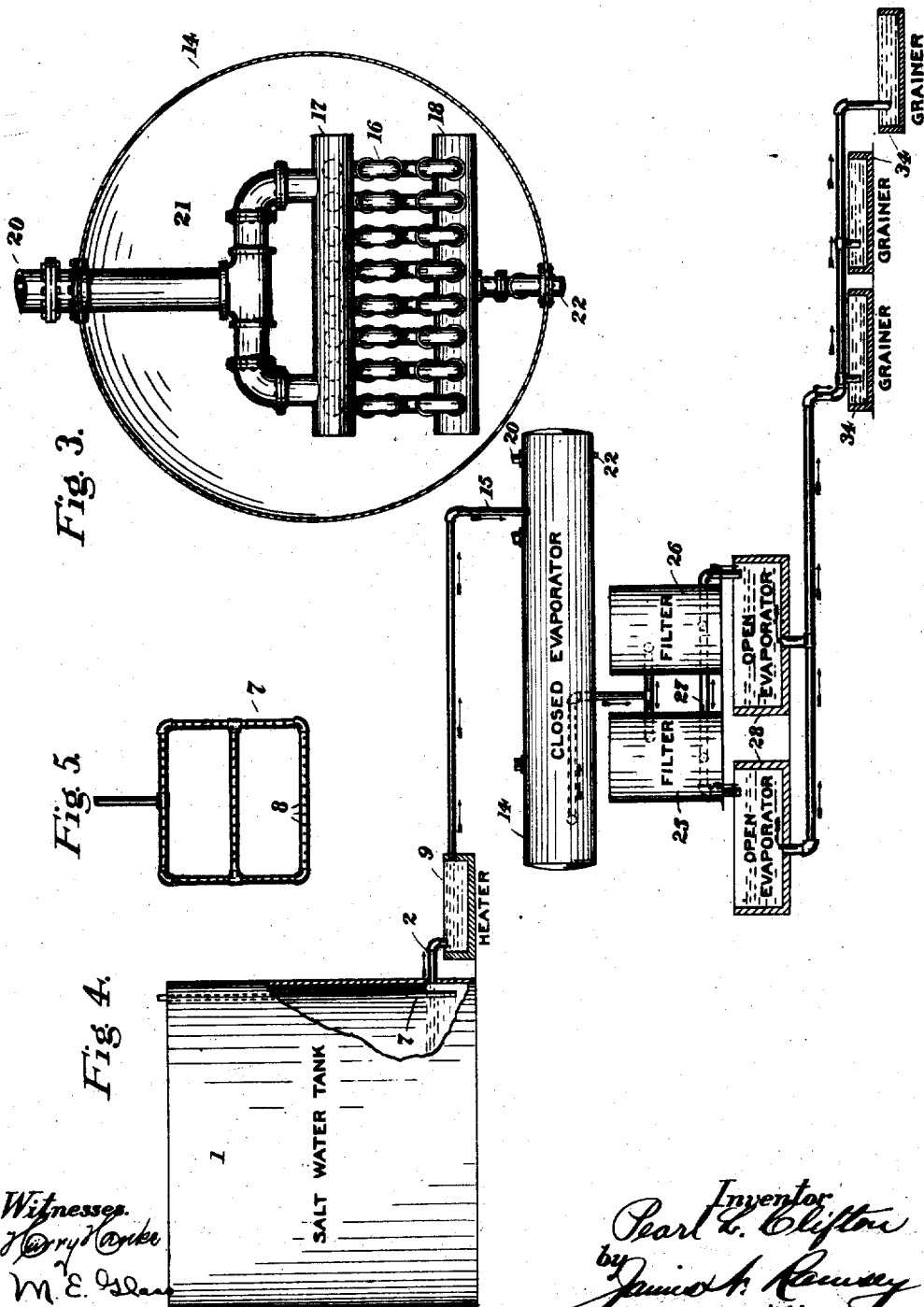

PEARL L. CLIFTON, OF POMEROY, OHIO, ASSIGNOR TO THE POMEROY SALT ASSOCIATION COMPANY, OF POMEROY, OHIO, A CORPORATION OF OHIO.

SALT-MAKING MACHINERY.

No. 903,358.  Specification of Letters Patent.  Patented Nov. 10, 1908.

Application filed April 25, 1906. Serial No. 313,534.

*To all whom it may concern:*

Be it known that I, PEARL L. CLIFTON, a citizen of the United States, residing at Pomeroy, in the county of Meigs and State of Ohio, have invented certain new and useful Improvements in Salt-Making Machinery, of which the following is a specification.

My invention relates to machinery for the manufacture of salt from natural salt brine.

The object of my invention is to simplify and cheapen the manufacture of salt and to improve its quality.

My invention consists in a closed evaporator, means for admitting salt brine therein and discharging it therefrom and having a steam space therein above said salt brine, a steam coil in said closed evaporator adapted to be immersed in the salt brine to produce evaporation, means for supplying steam to said steam coil, an exhaust for said steam coil, and sufficient means for freely exhausting the steam formed from the brine to permit the steam being generated to be rapidly and readily released from the brine.

My invention also consists in the details of construction and in the parts, combination and arrangement of parts as herein set forth and claimed.

In the drawings, which serve to illustrate the construction and arrangement of my invention: Figure 1 is a diagrammatic plan view showing the location and arrangement of my invention with reference to the other parts of a salt making plant. Fig. 2 is an enlarged longitudinal section of the end portions of the closed evaporator showing the various pipes in full lines, the center being broken away for lack of space. Fig. 3 is a vertical section on the line $x$—$x$ of Fig. 2, showing the pipes in elevation. Fig. 4 is a diagrammatic view of my invention and the other parts of a salt making plant in relation thereto. Fig. 5 is a side elevation of the aerator.

The construction and operation of a salt making plant according to my invention is preferably substantially as follows: A salt brine tank 1 of any suitable construction but preferably cylindrical in form and having an open top and a discharge outlet 2 near its bottom is adapted to be supplied with natural salt brine pumped from wells, such as 3, 4 and 5, by means of an air compressor 6 having suitable connection with said wells and said wells being provided with pipes (not shown) to convey the brine into said tank. Said salt brine tank 1 is provided with an aerator 7 placed adjacent the discharge outlet 2 communicating with said air compressor and is provided with perforations 8 to distribute and thoroughly aerate the brine to oxidize iron therein before it is discharged from the salt brine tank.

A heater 9 comprising an open top receptacle for the brine through the discharge outlet 2 is arranged near the salt brine tank 1. This heater 9 is provided with steam coils 10 distributed therein and adapted to be supplied with exhaust steam from the air compressor for the purpose of heating brine in which said coils are immersed from about 60 degrees F. to about 180 degrees F. to oxidize iron in the brine and to prepare the brine for further treatment. The air compressor 6 is supplied with steam from the boilers 11 and 12 through steam pipe 13. The brine is conveyed from the heater 9 into a closed evaporator 14 by means of a brine tube 15 which extends from near the top of the heater to near the bottom of the closed evaporator. The closed evaporator is provided in its lower part with a series of steam coils 16 secured in and communicating with a manifold 17 at one end and 18 at the other and supplied with live steam from boiler 19 through steam pipe 20 which steam is adapted to circulate through said series of coils which are immersed in the brine to heat the same to a high degree of temperature for the purpose of generating steam which is collected in the steam space 21, to oxidize the remaining iron in the brine, to increase the specific gravity of the unevaporated brine and to be exhausted through discharge or exhaust pipe 22 into a steam trap or condenser 23 from which the condensation is returned to the boiler in the form of hot water through hot water tube 24 for continuous use.

The salt brine in the closed evaporator is conveyed to a filter 25 or 26 where the oxidized iron and other ingredients deleterious to the salt are mechanically separated from the salt brine which is conveyed therefrom through pipes 27 to open evaporators 28 where it is heated by the exhaust steam generated from the salt brine in the closed evaporator 14, the same being conveyed by steam pipe 29 to steam coils 30 immersed in the brine and provided with a discharge outlet or exhaust pipe 31 through which the condensed steam is exhausted into a suitable condensing tank 32 from which it may be pumped into the feeding tank 33, as indicated by dotted line. This feeding tank 33 is a fresh water storage tank for boiler feed purposes.

The brine in the open evaporator is simultaneously heated and aerated until the proper specific gravity of the brine is obtained. It is then conveyed into grainers 34 comprising open receptacles which are supplied with steam coils 35 suspended therein above the bottom of each grainer and which are supplied with steam generated from the brine in the closed evaporator 14 and conveyed by steam pipe 36 into said grainers where it passes through the steam coils 35 and heats the brine sufficiently to precipitate the salt therein, the steam in the coils condensing and passing into the condensing tank 32. Each grainer is preferably provided with an endless carrier adapted to engage the inner bottom surface from end to end and draw the salt as it precipitates up inclines 37 to a draining room 38 where the salt is deposited and drained in the usual way.

I have shown filters 25 and 26 respectively and prefer to use then alternately in order that one may be cleaned while the other is in use and vice versa thus avoiding any interruption in the operation. If desired, however, one filter only may be used. The salt is conveyed from the draining room to a storeroom where it is allowed to remain until sufficiently dry to be in condition for shipment in barrels or otherwise as desired.

The construction and arrangement of machinery employed herein for the manufacture of salt according to my invention is such as to economize in the use of fuel because practically all of the heat units are utilized and preserved for continuous use in some form. Considerable apparatus is also dispensed with such as settling tanks, only two open evaporators being required in place of four settling tanks which were formerly used. Less fuel is required to produce the necessary heat for operating the plant. An inferior and cheaper grade of fuel used in the boilers to produce the steam accomplishes better results than a superior and more expensive grade of fuel used in a furnace to furnish direct heat to evaporating pans. The quantity of fuel being less and other machinery heretofore operated being dispensed with there is also a saving in labor by the use of my machinery. The combined use of the aerator, heater, closed evaporator and filter to purify the brine increases its density more rapidly and effects a saving of time which increases the capacity of the plant correspondingly and enables a much larger volume of salt to be produced in a given time.

It will be apparent that changes in the particular construction and arrangement of my machinery may be made without material departure from the scope and spirit of the invention.

I claim:

1. A salt making apparatus comprising a salt brine tank having a discharge outlet near the bottom, an aerator in said tank adjacent said outlet, an open heater adapted to receive the aerated brine from said tank, steam coils in said open heater adapted to heat said aerated brine to a given degree of temperature, a closed evaporator below the plane of said heater and a brine space therein comprising substantially the lower half of said evaporator, a brine tube extending from near the top of said open heater to near the bottom of said closed evaporator, a steam coil arranged within said brine space and immersed within the brine therein, a live steam pipe communicating therewith and an exhaust or discharge pipe leading therefrom, a brine outlet in said closed evaporator, at the brine line, a filter below the plane of said closed evaporator, a brine tube extending from said brine outlet to said filter adapted to convey the brine from said evaporator to said filter, an open evaporator below the plane of said filter, a brine pipe adapted to convey the brine from said filter to said open evaporator, a grainer below the plane of said open evaporator, a brine tube adapted to convey the brine from said open evaporator to said grainer, steam coils in said open evaporator and grainer, respectively, and steam pipes adapted to carry steam from the top of said steam space in the closed evaporator to the steam coils in said open evaporator and grainer, respectively, substantially as and for the purpose set forth.

2. A salt making apparatus comprising a salt brine tank having a discharge outlet, an aerator adjacent said outlet, an open top heater adapted to receive aerated brine from said outlet, a closed evaporator having a brine space adapted to receive brine from said heater and having a steam space above said brine space, a filter adapted to receive brine from said closed evaporator, an open evaporator adapted to receive brine from said filter, a grainer adapted to receive brine from said open evaporator, a steam coil immersed in the brine in said closed evaporator, means for passing live steam therethrough to generate steam from the salt brine and release same in said steam space without exerting pressure on said brine, exhaust means for said steam coil and means for carrying the steam from said steam space into coils in the open evaporator and grainer, substantially as and for the purposes set forth.

3. A salt making apparatus comprising a tank 1, having discharge outlet 2, an aerator 7 within said tank adjacent said outlet, an open top heater 9, a closed evaporator 14, a brine tube 15 extending from near the top of said heater 9 to near the bottom of said evaporator 14, a filter 26, a brine tube adapted to convey brine from near the top of the brine line in said closed evaporator into said filter, open evaporator 28, pipe 27 adapted to carry brine from said filter into said open evaporator, a grainer, a brine tube extending from the open evaporator to said grainer, a steam pipe 29 and a steam pipe 36 communicating with steam coils 30 in the evaporators and steam coils 35 in the grainers respectively, substantially as and for the purposes set forth.

PEARL L. CLIFTON.

Witnesses:
H. P. COLLINS,
JAMES N. RAMSEY.